United States Patent [19]

Michalek et al.

[11] Patent Number: 5,241,439
[45] Date of Patent: Aug. 31, 1993

[54] COMBINED READ/WRITE THIN FILM MAGNETIC HEAD WITH TWO PAIRS OF FLUX GUIDES

[75] Inventors: P. Michalek, Bloomington, Minn.; Victor Zieren, Eindhoven, Netherlands; Jacobus J. M. Ruigrok, Eindhoven, Netherlands; Gerardus H. J. Somers, Eindhoven, Netherlands

[73] Assignee: U.S. Philips Corporation, New York, N.Y.

[21] Appl. No.: 725,094

[22] Filed: Jul. 2, 1991

[51] Int. Cl.$^5$ ............................................. G11B 5/127
[52] U.S. Cl. ................................................. 360/113
[58] Field of Search ...................... 360/113; 338/32 R; 324/252

[56] References Cited

U.S. PATENT DOCUMENTS 3,975,772  8/1976  Lin ........................................ 360/113
4,754,354  6/1988  Jeffers ................................. 360/113

*Primary Examiner*—Craig E. Church
*Attorney, Agent, or Firm*—John C. Fox

[57] ABSTRACT

Thin-film magnetic head comprising a substrate (2), an inductive element (23) and a magnetoresistive element (7), and substantially parallel extending flux guides of a magnetic conducting material for magnetic cooperation with said elements. The flux guides are mutually arranged in such a way that two pairs of flux guides (3A, 3B; 5A, 5B) mutually separated by an insulation layer (19) of a non-magnetic material are present, a first pair constituting a first magnetic circuit, provided with a write gap (27), for the inductive element and a second pair constituting a second magnetic circuit, provided with a read gap (17), for the magnetoresistive element.

21 Claims, 1 Drawing Sheet

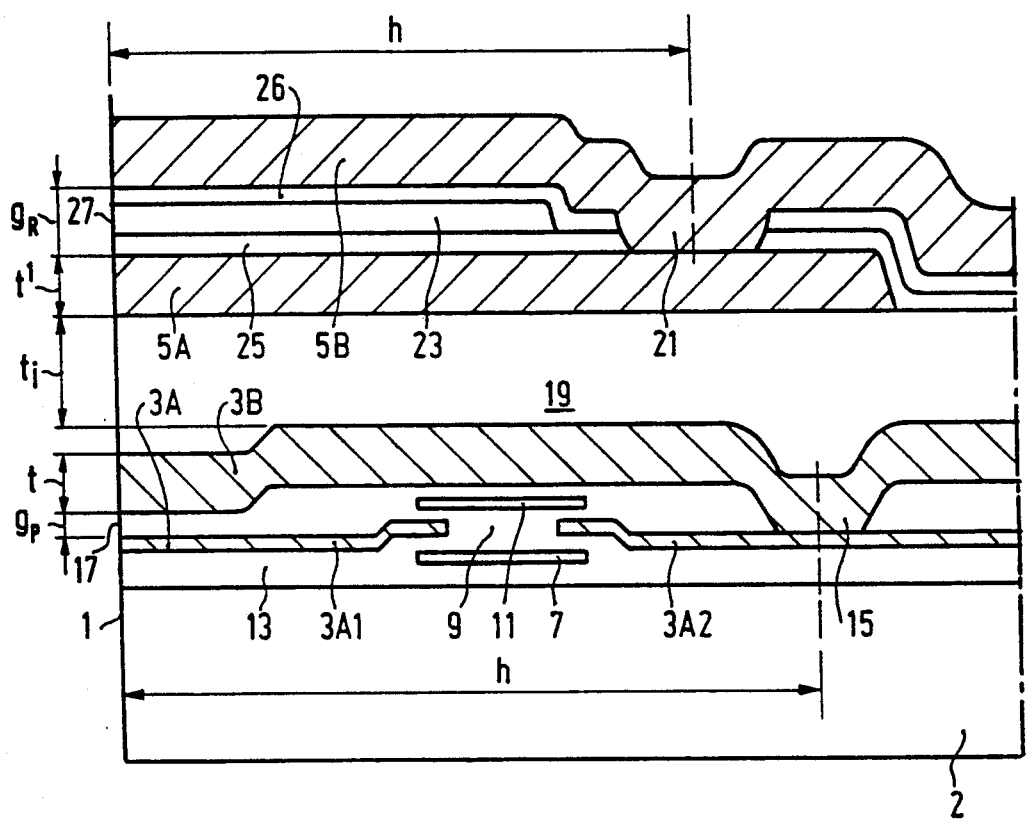

COMBINED READ/WRITE THIN FILM MAGNETIC HEAD WITH TWO PAIRS OF FLUX GUIDES

CROSS REFERENCE TO RELATED APPLICATIONS

Copending U.S. patent application Ser. No. 703,539, filed May 21, 1991 and assigned to North American Philips Corporation relates to a combined read/write thin film magnetic head with a shared flux guide.

BACKGROUND OF THE INVENTION

The invention relates to a thin-film magnetic head comprising a substrate, an inductive element and a magnetoresistive element, which elements are arranged at different distances from the substrate, and substantially parallel extending flux guides of a magnetic conducting material for magnetic cooperation with said elements, a non-magnetic write gap adjacent to a tape contact face and a non-magnetic read gap adjacent to the tape contact face extending between said flux guides, said gaps, viewed from the substrate, being situated one behind the other, the flux guide farthest remote from the inductive element being an interrupted guide having two spatially separated flux guide parts between which a space bridged by the magnetoresistive element is present.

A magnetic head of this type is known from published Japanese Patent JP-A 62-145527 (herein incorporated by reference). The known magnetic head is a combined write/read head having a tape contact face, which is manufactured in accordance with a thin-film technique and comprises three flux guides, viz. two outer flux guides and one central flux guide. An inductive element in the form of an electric conductor and a non-magnetic layer are provided between one of the outer flux guides and the central flux guide, the non-magnetic layer defining a write gap. The known magnetic head thereby forms a write portion, with areas of a medium, for example, a magnetic tape moving along the tape contact face being magnetized for writing information on the magnetic medium when the electric conductor is controlled. A magnetoresistive element, a bias winding and a non-magnetic layer defining a read gap are provided between the central flux guide and the other outer flux guide. The portion of the known magnetic head formed thereby is a read portion for detecting magnetic areas on the medium moving along the tape contact face and thus reading information on the medium.

In the known magnetic head the central flux guide is a shared flux guide which forms part of a magnetic yoke of the write portion as well as of a magnetic yoke of the read portion of the magnetic head. It is known per se that a write gap may function as a read gap when information is being read. This phenomenon is utilized in a structure in which information is written and read by one and the same inductive element. However, in the write/read magnetic head known from said Japanese patent publication the write gap functioning as a read gap has the detrimental result that magnetic flux of a part of the passing medium which is opposite the write gap is guided towards the magnetoresistive element via the shared central flux guide. As a result, extra magnetic pulses are introduced into the magnetoresistive element, which pulses interfere with the magnetic pulses guided towards the magnetoresistive element via the read gap, which perturbs the signal to be measured and detrimentally influences the signal-to-disturbance ratio of the magnetic head.

The detrimental phenomenon described hereinbefore, which occurs in the known magnetic head during operation, is elucidated as follows. If it is assumed that a small magnetized area on a recording medium, for example, a magnetic tape is present just in front of the write gap, this area can be considered to be an almost ideal flux source due to the low permeability of the medium. A part of the flux, which is dependent on the distance from and the size of the write gap, will enter the write portion via the outer flux guide adjacent to the write gap and will leave the write portion via the central flux guide, or vice versa. The greater part of the magnetic flux entering the write portion returns to the tape contact face via the magnetic yoke of the write portion. However, since the outer flux guide adjacent to the read gap extends parallel to and at a short distance from the shared central flux guide, a certain part of the flux sucked up in the write portion crosses over to the last-mentioned outer flux guide. This part of the flux subsequently traverses the sensitive magnetoresistive element and then returns mainly via the central flux guide to the magnetized area on the medium. The flux part which directly crosses over to said magnetic area from the outer flux guide adjacent to the read gap is negligibly small due to the relatively large distance between this flux guide and the magnetic area and due to the exponential character of the distance losses then occurring. Dependent on the direction of movement of the medium, the part of the flux traversing the magnetoresistive element gives rise to an extra pulse before or after the main pulse which results from reading said magnetized area by the read portion of the magnetic head.

Measurements and calculations which have been carried out on magnetic head structures related to the known magnetic head show extra pulses with an amplitude ranging between 5 and 15% of the amplitude of the main pulse, dependent on the thickness of the flux guides, particularly the central flux guide, and on the permeability of the soft-magnetic material of the flux guides.

Moreover, when information is being written, the quantity of magnetic flux generated by the inductive element and guided towards the magnetoresistive element via the shared flux guide may be so much that the magnetoresistive element is destabilized, which may considerably reduce its sensitivity.

It is to be noted that a combined write-read/erase magnetic head assembly comprising inductive elements only is known from JP-A 61-243914 (herein incorporated by reference). This known thin-film magnetic head assembly comprises an erase head arranged on a substrate and being provided with two magnetic layers and a coil wound around one of the layers, and a write-read head arranged on the erase head and provided with two further magnetic layers and a further coil located in a plane extending parallel to the substrate. A reduction of crosstalk is envisaged with this coil configuration.

OBJECTS AND SUMMARY OF THE INVENTION

It is an object of the invention to provide a magnetic head of the type described in the opening paragraph in which a better magnetic separation between the write portion and the read portion of the magnetic head is achieved.

To this end the magnetic head according to the invention is characterized in that two pairs of flux guides, mutually separated by an insulation layer of a non-magnetic material, are provided, a first pair constituting a first magnetic circuit, provided with the write gap, for the inductive element, and a second pair constituting a second magnetic circuit, provided with the read gap, for the magnetoresistive element.

In the magnetic head according to the invention, a distance is created between the write portion and the read portion so as to form large magnetic cross-over resistances between said magnetic circuits in order to inhibit crossing fluxes. The magnetic head according to the invention is suitable for analog as well as digital recording. Single or multitrack audio, video and data recording are possible applications.

It has been found that in the magnetic head according to the invention the thickness of the flux guides adjacent to the insulation layer plays an important role in the extent to which flux crosses over from the one to the other part of the magnetic head. In this connection it is desirable to choose the thickness and permeability of the central flux guides as large as is technologically possible. Moreover, it is preferred to choose the ratio between the layer thicknesses of the two central flux guides to be at most 1:2 in the case of a given overall layer thickness. A ratio of 1:1 is particularly favorable.

It has also been found that the thickness of the insulation layer between the two pairs of flux guides plays an important role in the extent to which interfering pulses are passed on to the magnetoresistive element. Very good results have been achieved with the embodiment of the magnetic head according to the invention which is characterized in that the insulation layer between said pairs of flux guides has a thickness which is at least equal to $h^2/\mu_r.t$, in which h is the height of the shortest of said magnetic circuits, viewed from the tape contact face, and in which $\mu_r$ is the relative permeability of the material and t is the thickness of the flux guide of the second magnetic circuit, which flux guide is adjacent to the insulation layer. The insulation layer between said pairs of flux guides preferably has a thickness of at least 3 μm at least proximate to the tape contact face.

An embodiment of the magnetic head according to the invention is characterized in that the magnetoresistive element is present at a side, remote from the inductive element, of the flux guide situated farthest remote from the inductive element. In this embodiment the number of interfering magnetic pulses passed on to the magnetoresistive element is reduced to a further extent. An additional advantage is an efficiency improvement of the read portion of the magnetic head.

A technologically attractive embodiment is characterized in that the flux guide situated farthest remote from the inductive element is the flux guide situated closest to the non-magnetic substrate, the magnetoresistive element extending between said flux guide and the substrate.

One embodiment is characterized in that the inductive element extends as far as the tape contact face. This has the advantage that the height of the first magnetic circuit may be smaller than in conventional write head configurations. As a result, the extra pulse is smaller. Technological advantages of this embodiment are its planar structure and insensitivity to gap height variations.

The magnetic head according to the invention may be manufactured by means of conventional thin-film techniques in which the magnetic head structure is built up layer by layer by means of techniques such as sputtering, etching and vapour deposition.

BRIEF DESCRIPTION OF THE DRAWING

The invention will now be described in greater detail by way of example with reference to the accompanying drawing in which the FIGURE is a diagrammatic cross-section of an embodiment of the magnetic head according to the invention.

DESCRIPTION OF THE PREFERRED EMBODIMENTS

The thin-film magnetic head according to the invention shown in the FIGURE has a tape contact face 1 for cooperation with a magnetic recording medium and comprises a non-magnetic substrate 2 of, for example, a ceramic material such as $Al_2O_3/TiC$. Two pairs of flux guides 3A, 3B and 5A, 5B, extending mainly parallel to the substrate 2 and consisting of a magnetic conducting material, for example, sendust, permalloy or an amorphous alloy, are provided. A magnetoresistive element 7 is present between the substrate 2 and the first flux guide 3A, the flux guide 3A opposite the magnetoresistive element 7 being interrupted for forming a non-magnetic space 9.

The flux guide parts extending at both sides of the space 9 and being denoted by 3A1 and 3A2 partly overlap the magnetoresistive element. A bias winding 11 for generating a bias magnetic field for premagnetizing the magnetoresistive element 7, is provided between the first flux guide 3A and the second flux guide 3B. Suitable magnetic and/or electrically insulating layers of, for example, an oxide such as $SiO_2$ or $Al_2O_3$, a synthetic resin or a photolacquer, are provided on the substrate 2 and between the conducting layers, of the magnetoresistive element 7, the flux guide 3A, the bias winding 11 and the flux guide 3B. These layers are denoted collectively by the single reference numeral 13. The flux guides 3A and 3B, which may be interconnected in an area 15, define a non-magnetic read gap 17 having a gap length $g_p$ at the tape contact face 1 and constitute a magnetic circuit (second magnetic circuit) for the magnetoresistive element 7. The portion of the magnetic head described so far is the read portion of the magnetic head according to the invention.

An insulation layer 19 of, for example, $Al_2O_3$ functioning as a base for the write portion of the magnetic head, is provided on the flux guide 3B. The insulation layer 19 has a thickness of at least 3 μm proximate to the tape contact face 1. The write portion comprises the above-mentioned flux guides 5A and 5B, interconnected at an area 21, and an inductive element 23 extending between the third flux guide 5A and the fourth flux guide 5B. The element 23 is a coil preferably extending as far as the tape contact face. Magnetically and electrically insulating layers 25, 26 of, for example, $SiO_2$ or a suitable polymer, are present between the flux guides 5A and 5B and the coil 23. The flux guides 5A and 5B, which define a write gap 27 having a gap length $g_R$ at the tape contact face, constitute a magnetic circuit (first magnetic circuit) for the inductive element 23.

As is clearly shown in the FIGURE, the magnetoresistive element 7 is present at the side, remote from the inductive element 23, of the first flux guide 3A which is situated farthest remote from the inductive element to, and hence element 7 is between the substrate 2 and this flux guide. The magnetoresistive element 7 is preferably provided with a barber pole as is shown in U.S. Pat. No. 4,052,748, herein incorporated by reference.

The two central flux guides 3B and 5A have the same thickness t and $t^1$ of, for example, 2 μm in this embodiment. The insulation layer 19 between the magnetic circuits of the write portion and the read portion, particularly between the central flux guides 5B and 3A, has a thickness $t_1$ which is at least equal to $h_1^2/\mu_r.t$ in which $h_1$ is the height, for example, 50 μm, between the tape contact face 1 and approximately the center of the interconnection area 21 of the flux guide 5A and the flux guide 5B, and $\mu_r$ is the relative permeability, for example, 2000, of the material of the flux guide 3B. If there is no interconnection area, an effective height can be defined. If the height of the second magnetic circuit $h_2$ in the embodiment shown had been smaller than the indicated height $h_1$ of the first magnetic circuit, $h_2$ would have been the height in the above-mentioned relation.

It is to be noted that the invention is not limited to the embodiment shown. The measures according to the invention are notably very suitable for use in magnetic heads having various juxtaposed structures with read and write functions.

We claim:

1. A thin film magnetic head comprising
 (a) substrate,
 (b) an inductive element and a magnetoresistive element, which elements are arranged at different distances above the substrate,
 (c) a tape contact face,
 (d) substantially parallel extending flux guides each of a magnetic conducting material for magnetic cooperation with said elements,
 (e) a non-magnetic write gap adjacent to the tape contact face, and a non-magnetic read gap adjacent to the tape contact face, the gaps extending between said flux guides and, viewed from the substrate, situated one behind the other, the flux guide farthest from the inductive element being an interrupted guide having two spatially separated flux guide parts, the magnetoresistive element being present adjacent the space,
 characterized in that the flux guides comprise two pairs of upper and lower flux guides mutually separated by insulating layers of non-magnetic material, a first pair constituting a first magnetic circuit, defining the write gap, for the inductive element, and a second pair constituting a second magnetic circuit, defining the read gap, for the magnetoresistive element, the lower guide of the first pair and the upper guide of the second pair being central flux guides,
 and further characterized in that the ratio between the layer thicknesses of the two central flux guides is at most 1:2.

2. A magnetic head as claimed in claim 1, characterized in that the insulation layer between said pairs of flux guides has a thickness which is at least equal to $h^2/\mu_r.t$, in which h is the height of the shortest of said magnetic circuits, viewed from the tape contact face, and in which $\mu_r$ is the relative permeability of the material and t is the thickness of the upper flux guide of the second magnetic circuit, which flux guide is adjacent to the insulation layer.

3. A magnetic head as claimed in claim 1, characterized in that the insulation layer between said pairs of flux guides has a thickness of at least 3 μm at least proximate to the tape contact face.

4. A magnetic head as claimed in claim 1, characterized in that the magnetoresistive element is present adjacent a side, remote from the inductive element, of the flux guide situated farthest from the inductive element.

5. A magnetic head as claimed in claim 1, characterized in that the flux guide situated farthest from the inductive element is the flux guide situated closest to the non-magnetic substrate, the magnetoresistive element extending between said flux guide and the substrate.

6. A magnetic head as claimed in claim 1, characterized in that the inductive element extends as far as the tape contact face.

7. A magnetic head as claimed in claim 1, characterized in that the insulation layer between said pairs of flux guides has a thickness which is at least equal to $h^2/\mu_r.t$, in which h is the height of the shortest of said magnetic circuits, viewed from the tape contact face, and in which $\mu_r$ is the relative permeability of the material and t is the thickness of the upper flux guide of the second magnetic circuit, which flux guide is adjacent to the insulation layer.

8. A magnetic head as claimed in claim 1, characterized in that the insulation layer between said pairs of flux guides has a thickness of at least 3 μm at least proximate to the tape contact face.

9. A magnetic head as claimed in claim 2, characterized in that the insulation layer between said pairs of flux guides has a thickness of at least 3 μm at least proximate to the tape contact face.

10. A magnetic head as claimed in claim 1, characterized in that the magnetoresistive element is present adjacent a side, remote from the inductive element, of the flux guide situated farthest from the inductive element.

11. A magnetic head as claimed in claim 2, characterized in that the magnetoresistive element is present adjacent a side, remote from the inductive element, of the flux guide situated farthest from the inductive element.

12. A magnetic head as claimed in claim 3, characterized in that the magnetoresistive element is present adjacent a side, remote from the inductive element, of the flux guide situated farthest from the inductive element.

13. A magnetic head as claimed in claim 1, characterized in that the flux guide situated farthest remote from the inductive element is the flux guide situated closest to the non-magnetic substrate, the magnetoresistive element extending between said flux guide and the substrate.

14. A magnetic head as claimed in claim 2, characterized in that the flux guide situated farthest remote from the inductive element is the flux guide situated closest to the non-magnetic substrate, the magnetoresistive element extending between said flux guide and the substrate.

15. A magnetic head as claimed in claim 3, characterized in that the flux guide situated farthest from the inductive element is the flux guide situated closest to the non-magnetic substrate, the magnetoresistive element extending between said flux guide and the substrate.

16. A magnetic head as claimed in claim 4, characterized in that the flux guide situated farthest from the inductive element is the flux guide situated closest to the non-magnetic substrate, the magnetoresistive element extending between said flux guide and the substrate.

17. A magnetic head as claimed in claim 1, characterized in that the inductive element extends as far as the tape contact face.

18. A magnetic head as claimed in claim 2, characterized in that the inductive element extends as far as the tape contact face.

19. A magnetic head as claimed in claim 3, characterized in that the inductive element extends as far as the tape contact face.

20. A magnetic head as claimed in claim 4, characterized in that the inductive element extends as far as the tape contact face.

21. A magnetic head as claimed in claim 5, characterized in that the inductive element extends as far as the tape contact face.

* * * * *